(12) United States Patent
Cai et al.

(10) Patent No.: US 9,497,746 B2
(45) Date of Patent: **\*Nov. 15, 2016**

(54) MULTICAST/BROADCAST SINGLE FREQUENCY NETWORK SUBFRAME PHYSICAL DOWNLINK CONTROL CHANNEL DESIGN

(71) Applicant: BlackBerry Limited, Waterloo (CA)

(72) Inventors: Zhijun Cai, Euless, TX (US); James Earl Womack, Bedford, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 424 days.

This patent is subject to a terminal disclaimer.

(21) Appl. No.: 13/905,916

(22) Filed: May 30, 2013

(65) Prior Publication Data

US 2013/0265929 A1  Oct. 10, 2013

Related U.S. Application Data

(63) Continuation of application No. 12/762,142, filed on Apr. 16, 2010, now Pat. No. 8,477,675.

(60) Provisional application No. 61/170,450, filed on Apr. 17, 2009.

(51) Int. Cl.
*H04W 72/04* (2009.01)
*H04B 7/155* (2006.01)
(Continued)

(52) U.S. Cl.
CPC ............ *H04W 72/042* (2013.01); *H04B 7/155* (2013.01); *H04B 7/2606* (2013.01); *H04W 72/005* (2013.01); *H04W 88/04* (2013.01)

(58) Field of Classification Search
None
See application file for complete search history.

(56) References Cited

U.S. PATENT DOCUMENTS 6,724,740 B1   4/2004   Choi et al.
7,336,699 B2   2/2008   Mathew et al.
(Continued)

FOREIGN PATENT DOCUMENTS

CN   101296410 A   10/2008
WO   2008115614 A2   9/2008

OTHER PUBLICATIONS

3GPP TSG RAN1 #55; "Common Reference Symbol Mapping/Signaling for 8 Transmit Antennas"; R1-084408; Prague, Czech Republic; Nov. 10-14, 2008; 6 pages.
(Continued)

*Primary Examiner* — Adnan Baig
(74) *Attorney, Agent, or Firm* — Conley Rose, P.C.; J. Robert Brown, Jr.

(57) ABSTRACT

A relay node comprising a processor configured such that the relay node transmits a multicast/broadcast single frequency network (MBSFN) subframe including a control portion without a data portion, wherein the control portion comprises additional information assigned to any available resource elements (REs). Also included is a user agent (UA) comprising a processor configured such that the UA receives a MBSFN subframe including a control portion without a data portion, wherein the control portion comprises additional information assigned to any available REs. Also included is a method of wireless communication comprising transmitting a MBSFN subframe including a control portion without a data portion, wherein the control portion comprises additional information assigned to any available REs. Also included is a method of wireless communication comprising receiving a MBSFN subframe including a control portion without a data portion, wherein the control portion comprises additional information assigned to any available REs.

18 Claims, 8 Drawing Sheets

(51) Int. Cl.
H04B 7/26 (2006.01)
H04W 72/00 (2009.01)
H04W 88/04 (2009.01)

(56) References Cited

U.S. PATENT DOCUMENTS

| | | | |
|---|---|---|---|
| 8,155,070 B2 | 4/2012 | Lee et al. | |
| 2009/0059884 A1 | 3/2009 | Zhang et al. | |
| 2009/0180435 A1* | 7/2009 | Sarkar | H04L 5/14 370/330 |
| 2009/0252077 A1 | 10/2009 | Khandekar et al. | |
| 2010/0008282 A1 | 1/2010 | Bhattad et al. | |
| 2010/0027456 A1 | 2/2010 | Onggosanusi et al. | |
| 2010/0046412 A1* | 2/2010 | Varadarajan et al. | 370/312 |
| 2010/0067512 A1 | 3/2010 | Nam et al. | |
| 2010/0080166 A1* | 4/2010 | Palanki | H04B 7/2606 370/315 |
| 2010/0103854 A1 | 4/2010 | Lee et al. | |
| 2010/0110964 A1 | 5/2010 | Love et al. | |
| 2011/0299449 A1* | 12/2011 | Kwon | H04L 5/0023 370/312 |

OTHER PUBLICATIONS

Chinese Office Action; Application No. 201080026806.8; Aug. 20, 2014; 10 pages.
Chinese Office Action; Application No. 201080026806.8; Dec. 4, 2013; 9 pages.
Cai, Zhijun, et al.; U.S. Appl. No. 12/762,142, filed Apr. 16, 2010; Title: Multicast/Broadcast Single Frequency Network Subframe Physical Downlink Control Channel Design.
3GGP TSG-RAN Working Group 1 Meeting #56; "Control Channel and Data Channel Design for Relay Link in LTE-Advanced"; R1-090753; Athens, Greece; Feb. 9-13, 2009; 9 pages.
TSG-RAN WG1 #56; "Control Signaling Structures for Relay Link"; R1-090641; Athens, Greece; Feb. 9-13, 2009; 3 pages.
3GPP TSG RAN WG1 Meeting #55; "LS on Forward Compatibility Support in Rel-8"; R1-084538; Prague, Czech Rep.; Nov. 10-14, 2008; 1 page.
3GPP TSG RAN WG1 #54 Meeting; "Basic Structure of Relaying Under Multi-Antenna eNB"; R1-082775; Jeju Island, Korea; Aug. 18-22, 2008; 4 pages.
TSG-RAN WG1 #54; "Classification of Relays"; R1-083223; Jeju, South Korea; Aug. 18-22, 2008; 3 pages.
3GPP TSG-RAN WG1 #54; "Operation of Relays in LTE-A"; R1-083191; Jeju, South Korea; Aug. 18-22, 2008; 5 pages.
3GPP TSG RAN WG1 Meeting #53bis; "Application of Network Coding in LTE-Advanced Relay"; R1-082327; Warsaw, Poland; Jun. 30-Jul. 4, 2008; 4 pages.
TSG-RAN WG1 #54; "Application Scenarios for LTE-Advanced Relay"; R1-082975; Jeju, Korea; Aug. 18-22, 2008; 7 pages.
TSG-RAN WG1 #53; "A Discussion on Some Technology Components for LTE-Advanced"; R1-082024; Kansas City, Missouri; May 5-9, 2008; 11 pages.
3GPP TSG RAN WG1 Meeting #54bis; "Discussion on the TD Relay and FD Relay for FDD System"; R1-083676; Prague, Czech Republic; Sep. 29-Oct. 3, 2008; 5 pages.
3GPP TSG RAN WG1 #54bis; "Decode and Forward Relays for E-UTRA Enhancements"; R1-083533; Prague, Czech Republic; Sep. 29-Oct. 3, 2008; 5 pages.
TSG-RAN WG1 #57; "MBSFN Subframe and Control Structure for Relay Type 1 Nodes"; R1-091689; San Francisco, California; May 4-8, 2009; 5 pages.
3GPP TSG-RAN WG1 #56bis; "Relay Backhauling via MBSFN Sub Frame for TDD LTE System"; R1-091404; Seoul, Korea; Mar. 23-27, 2009; 5 pages.
3GPP RAN WG1 #55; "Support of Rel-8 UEs by LTE-A Relays"; R1-084384; Prague, Czech Republic; Nov. 10-14, 2008; 10 pages.
3GPP TSG RAN WG1 #55 Meeting; "Comparing Relay Support with MBSFN and Blank Subframes"; R1-084515; Prague, Czech Republic; Nov. 10-14, 2008; 4 pages.
3GPP TSG RAN WG1 Meeting #55; "LTE-A Relay Support via Existing MBSFN Signaling (10ms vs. 8ms periodicity)"; R1-084535; Prague, Czech Republic; Nov. 10-14, 2008; 2 pages.
3GPP TR 36.814 V0.4.1; 3rd Generation Partnership Project; Technical Specification Group Radio Access Network; Further Advancements for E-UTRA Physical Layer Aspects; Release 9; Feb. 2009; 31 pages.
3GPP TS 36.304 V8.4.0; 3rd Generation Partnership Project; Technical Specification Group Radio Access Network; Evolved Universal Terrestrial Radio Access (E-UTRA); User Equipment (UE) Procedures in Idle Mode; Release 8; Dec. 2008; 29 pages.
3GPP TS 36.331 V8.4.0; 3rd Generation Partnership Project; Technical Specification Group Radio Access Network; Evolved Universal Terrestrial Radio Access (E-UTRA); Radio Resource Control (RRC); Protocol Specification; Release 8; Dec. 2008; 198 pages.
3GPP TR 36.913 V8.0.0; 3rd Generation Partnership Project; Technical Specification Group Radio Access Network; Requirements for Further Advancements for E-UTRA (LTE-Advanced); Release 8; Jun. 2008; 14 pages.
IEEE P802.16j/D9; "Part 16: Air Interlace for Fixed and Mobile Broadband Wireless Access Systems—Multihop Relay Specification"; Feb. 4, 2009; 314 pages.
Cai, Sam, et al.; "Relay Research Overview"; Oct. 26, 2008; 37 pages.
Pabst, Ralf, et al.; "Relay-Based Deployment Concepts for Wireless and Mobile Broadband Radio"; IEEE Communications Magazine; Sep. 2004; 10 pages.
Soldani, David, et al.; "Wireless Relays for Broadband Access"; IEEE Communications Magazine; Mar. 2008; 9 pages.
Office Action dated May 22, 2012; U.S. Appl. No. 12/762,142, filed Apr. 16, 2010; 20 pages.
Final Office Action dated Oct. 29, 2012; U.S. Appl. No. 12/762,142, filed Apr. 16, 2010; 13 pages.
Advisory Action dated Jan. 4, 2013; U.S. Appl. No. 12/762,142, filed Apr. 16, 2010; 3 pages.
Notice of Allowance dated Mar. 21, 2013; U.S. Appl. No. 12/762,142, filed Apr. 16, 2010; 9 pages.
PCT International Search Report; Application No. PCT/US2010/031477; Jul. 19, 2010; 4 pages.
PCT Written Opinion of the International Searching Authority; Application No. PCT/US2010/031477; Jul. 19, 2010; 6 pages.
PCT International Preliminary Report on Patentability; Application No. PCT/US2010/031477; Jul. 20, 2011; 13 pages.
Chinese Office Action; Application No. 201080026806.8; Mar. 6, 2015; 12 pages.

* cited by examiner

MULTICAST/BROADCAST SINGLE FREQUENCY NETWORK SUBFRAME PHYSICAL DOWNLINK CONTROL CHANNEL DESIGN

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network nodes with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
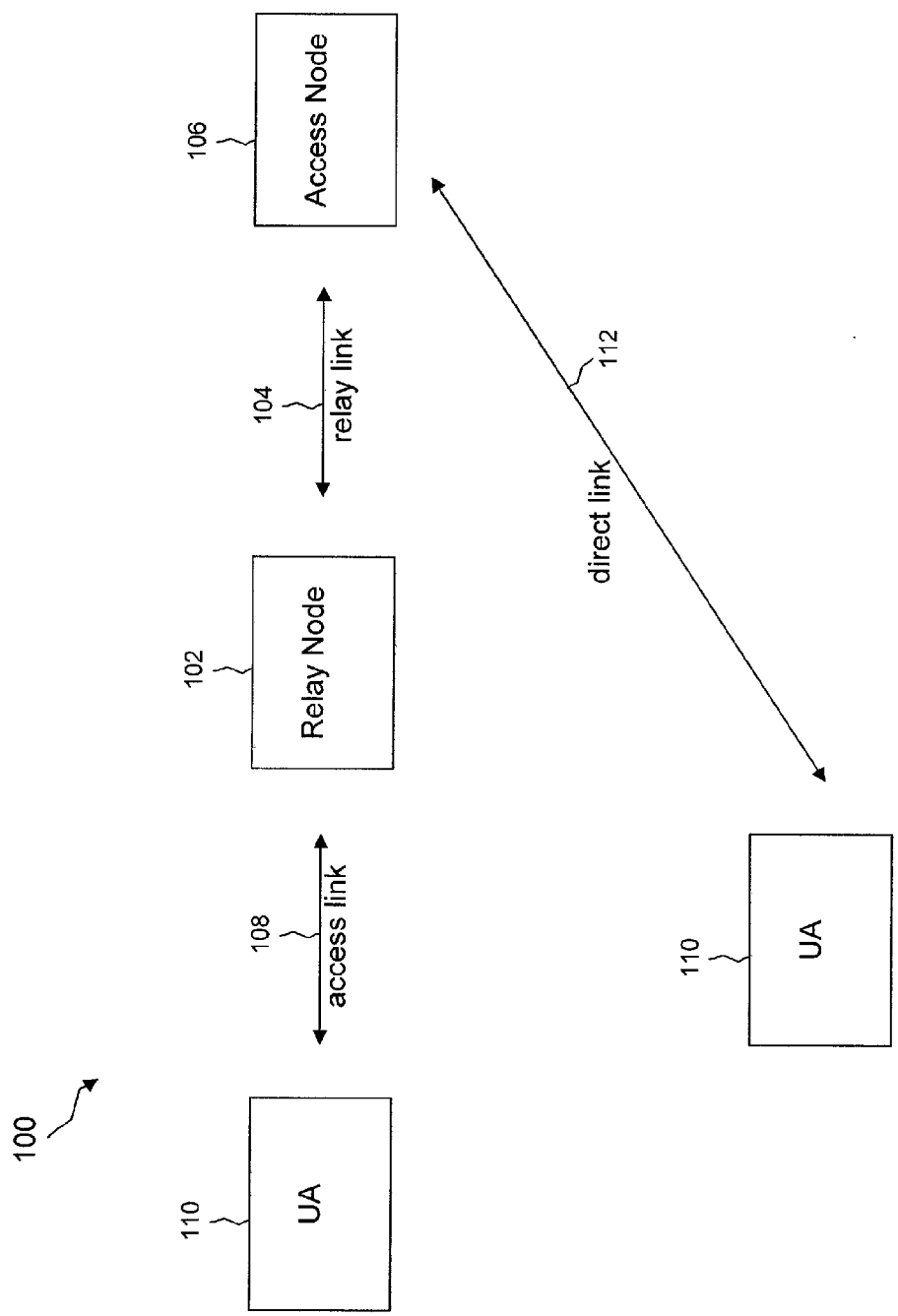
FIG. 1 is a diagram illustrating a wireless communication system that includes a relay node according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks, such as LTE or LTE-Advanced (LTE-A) networks, and all of the disclosed and claimed embodiments could be implemented in an LTE-A network. In some contexts, it may be said that LTE corresponds to release 8 (Rel 8) and release 9 while LTE-A corresponds to release 10 (Rel 10) and possibly beyond release 10. The relay node 102 can amplify or repeat a signal received from a UA 110 and cause the modified signal to be received at an access node 106. In some implementations of a relay node 102, the relay node 102 receives a signal with data from the UA 110 and then generates a new and/or different signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate using the same amount of bandwidth creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can demodulate and decode a transmission that it receives, re-encode the result of the decoding, and then transmit the modulated data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

The access node 106, the relay node 102, and the UE 110 may wirelessly communicate via at least one downlink channel, at least one uplink channel, or both. The downlink and uplink channels may be physical channels, which may be statically, semi-statically, or dynamically allocated network resources. For instance, the downlink and uplink channels may comprise at least one physical downlink shared channel (PDSCH), at least one PDCCH, at least one physical uplink shared channel (PUSCH), at least one physical downlink control channel (PUCCH), or combinations thereof. In an embodiment, the downlink and uplink channels may be established using time-division duplexing (TDD), where the signals may be transmitted, received, or both at different transmission time intervals (TTIs) using one or more frequencies. Specifically, the TDD may be used to allow the relay node 102 to communicate with the access node 106 and the UA 110 at the same frequency without employing substantially complicated radio frequency (RF) designs for the relay node 102. For instance, the relay node 102 may stop receiving a subframe from the access node 106 (over the relay link 104) at a TTI and transmit a subframe to the UA 110 (over the access link 108) at the same TTI. The relay node 102 may also stop transmitting a subframe to the access node 106 at a TTI and receive a subframe from the UA 110 at the same TTI.

However, at least Rel 8 UAs may require that at least a control portion to be transmitted on each subframe over the downlink for the UA 110. Accordingly, when the relay node 102 receives a subframe from the access node 106 at a TTI, the relay node 102 may transmit a subframe that comprises only a control portion to the UA 110 at the same TTI. The subframe that comprises only control information may be a multicast/broadcast single frequency network (MBSFN) subframe, as described in the 3GPP TS 36.211. Typically, the MBSFN subframe may comprise multicast information and may be transmitted from the access node 106 to the UA 110. When the MBSFN subframe is used to transmit only control information from the relay node 102 to the UA 110, the MBSFN subframe may comprise a PDCCH but not a PDSCH, as described in detail below.

Figure 2:
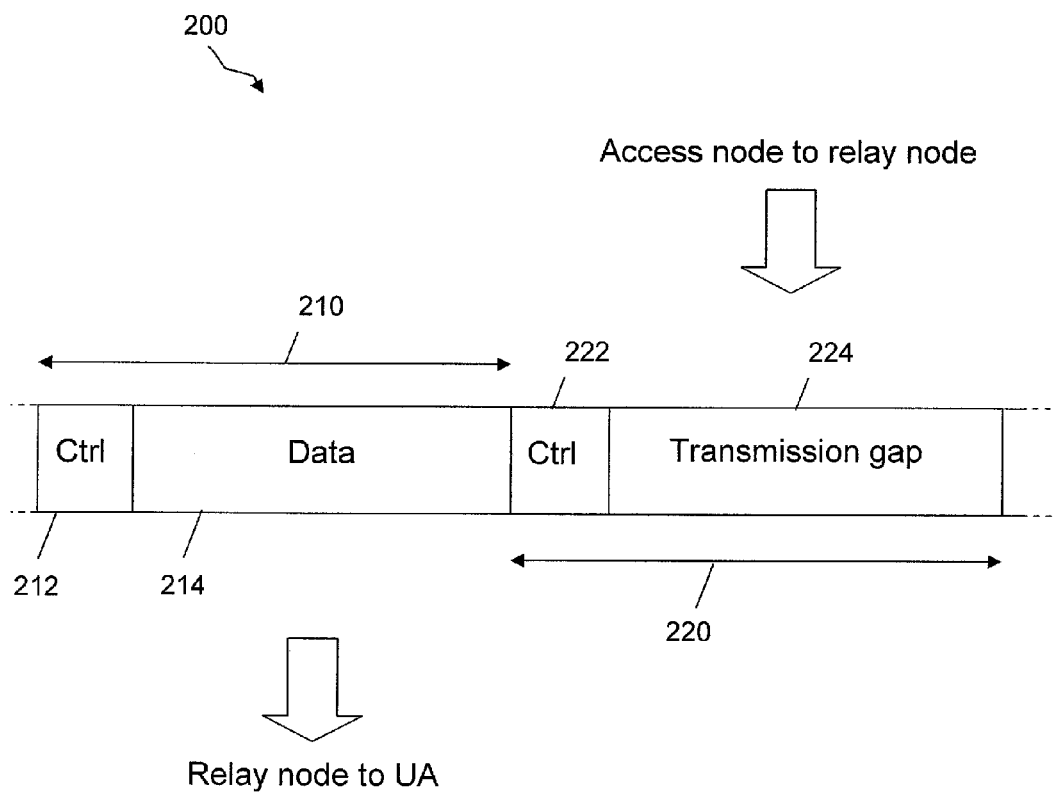
FIG. 2 is a diagram of a subframe sequence between a relay node and a UA according to an embodiment of the disclosure.

FIG. 2 illustrates a subframe sequence 200 between the relay node 102 and the UA 110. The subframe sequence 200 may include a first subframe 210 and a second subframe 220, which may be transmitted by the relay node 102 to the UA 110. The relay node 102 may transmit the first subframe 210 to the UA 110 via the access link 108. The relay node 102 may then receive a subframe from the access node 106 and transmit the second subframe 220 to the UA 110. The first subframe 210 may comprise a plurality of orthogonal frequency division multiplexing (OFDM) symbols, which may be transmitted in sequence in time. An OFDM symbol may carry user information that has gone through at least one encoding step. The user data may be transmitted using a plurality of physical resource blocks or resource elements (REs), e.g. at different time and frequency combinations.

The first subframe 210 may comprise a control portion 212 and a data portion 214. The control portion 212 may comprise DL control information, which may be provided using the OFDM symbols over the REs. The control portion 212 may comprise control channels including a PDCCH and other control information for managing communications and resource allocation. The data portion 214 may comprise a PDSCH that includes user data for the UA 110, such as voice and/or video data. As used herein, the terms control portion and control region may be used synonymously.

The second subframe 220 may be a MBSFN subframe, which may comprise a control portion 222 and a transmission gap portion 224. The transmission gap portion 224 may comprise no data or OFDM symbols and may not be allocated any REs. The control portion 222 may comprise a PDCCH. The control portion 222 may also comprise a plurality of reference or pilot signals. The reference signals may be used for channel estimation and mobility measurements to improve communication reliability. The PDCCH may comprise at least an uplink (UL) grant, which may indicate the allocated REs for a subsequent UL subframe from the UA 110, for example that may be sent after about four milliseconds (ms). The UL grant may be signaled in the PDCCH using a downlink control information (DCI) format 0, as described in 3GPP TS 36.212. The UL grant may comprise the UA ID associated with the UA 110. In an embodiment, to avoid simultaneous transmission and reception at the same time and frequency, the relay node 102 may not transmit a subframe to the access node 106 at about the time expected for receiving the subsequent UL subframe from the UA 110.

The control portion 222 may also comprise other control channels, such as a physical control format information channel (PCFICH) and a physical hybrid automatic repeat request indicator channel (PHICH). The PCFICH may be used to signal or indicate the number of OFDM symbols allocated to the control portion 222, and the PHICH may be used to send the non-acknowledgement (NACK)/acknowledgement (ACK) of the Hybrid Automatic Repeat Request (HARQ) process for uplink transmission.

Figure 3:
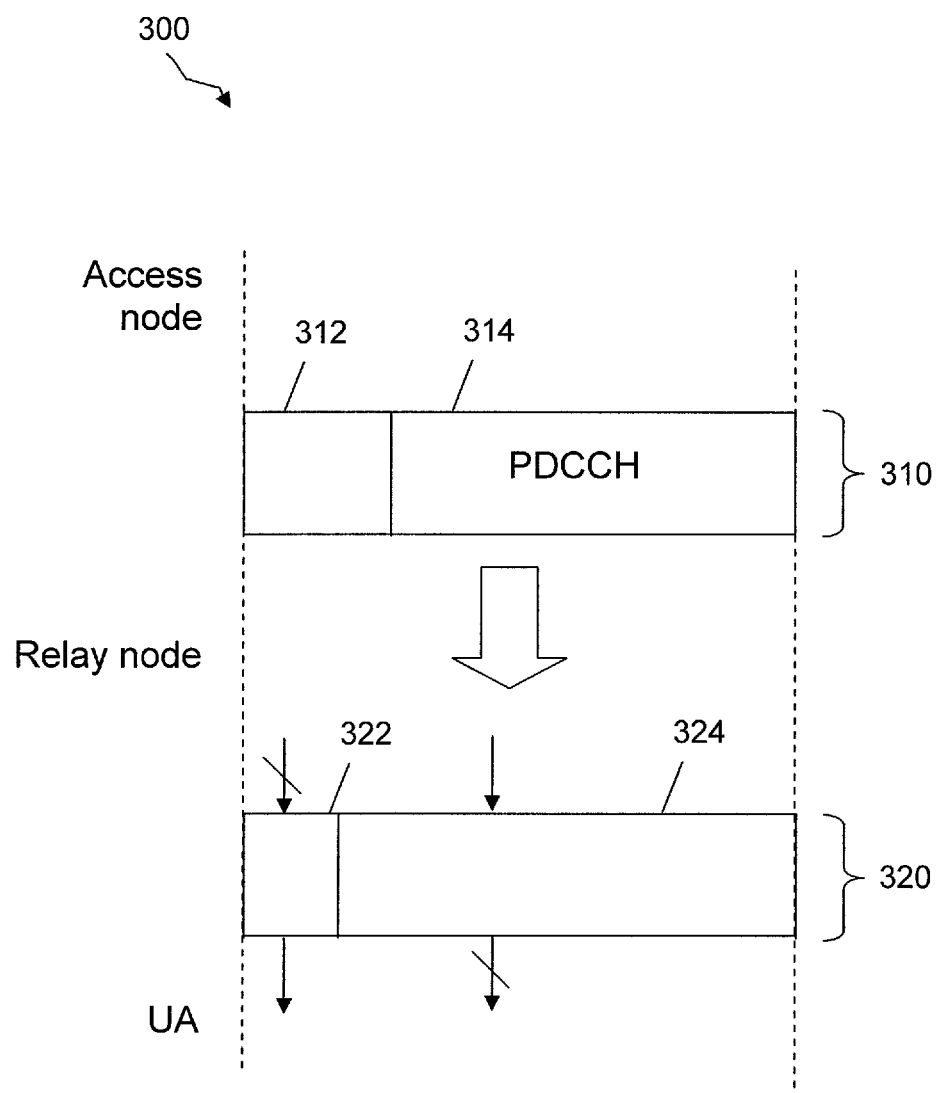
FIG. 3 is a diagram of a MBSFN subframe exchange between an access node, a relay node, and a UA according to an embodiment of the disclosure.

FIG. 3 illustrates a MBSFN subframe exchange 300 between the access node 106, the relay node 102, and the UA 110. The MBSFN subframe exchange 300 may comprise a subframe 310 and a MBSFN subframe 320, which may overlap in time. Specifically, the subframe 310 may be transmitted from the access node 106 to the relay node 102 via the relay link 104, and the MBSFN subframe 320 may be transmitted at about the same time from the relay node 102 to the UA 110 via the access link 108. Alternatively or additionally, the access node 106 may transmit the subframe 310 to a plurality of UAs in a cell or "donor" cell (covered by the RN) via direct links.

The subframe 310 may comprise a control portion 312 and a data portion 314, which may send control information and data information, respectively, to the relay node 102 and/or the UAs in the donor cell. The MBSFN subframe 320 may comprise a control portion 322 and a transmission gap portion 324, which may be substantially similar to the control portion 222 and the transmission gap portion 224, respectively. The relay node 102 may include the transmission gap portion 324 in the MBSFN subframe 320, for instance by disabling its transmitter, while receiving the data portion 314 from the access node 106. As such, the relay node 102 may avoid simultaneous reception and transmission at the same frequency. However, the relay node 102 may include the control portion 322 in the MBSFN subframe 320 to support Rel 8 requirements where UAs are expected to receive at least a control portion in each subframe. The control portion 322 may be configured by the relay node 102 and may comprise different control information than the control portion 312 of the access node 106 or other relay nodes in the system.

Typically, the quantity of REs used in the control portion 322 and similarly the control portion 222 may be substantially smaller than the total quantity of REs available. For example, the control portion (222 or 322) may comprise two OFDM symbols that may be transmitted using a 20 Megahertz (MHz) carrier bandwidth and may be allocated about 2400 available REs (e.g. a product of two OFDM symbols and 1200 subcarriers per OFDM symbol). The reference signals of the control portion may use about 400 REs from the available REs, for instance when the access node 106 uses two antennas for transmission. Additionally, the PCFICH of the control portion may use about 16 REs from the available REs. The control portion 222 may also comprise about 12 PHICH groups each comprising eight PHICHs, which may use about 16 REs from the available REs. Hence, the total number of used REs may be equal to about 560 and the remaining unused REs may be equal to about 1840 REs. If two MBSFN subframes are configured in one transmitted radio frame (or ten subframes), the number of unused UEs may then be equal to about 3680 REs per radio frame. Consequently, when the OFDM symbols are encoded using a quadrature phase shift key (QPSK) and rate ½ coding, a substantial portion of the transmission rate, e.g. about 368 kilobits per second (kbps), may not be used and is wasted. Further, if carrier aggregation is utilized, where a plurality of 20 MHz carriers are used for transmission, more resources may be wasted.

In an embodiment, to improve resource utilization and limit the wasting of resources for the PDCCH of the MBSFN subframe, more REs may be used to transmit additional control information in the control portion of the MBSFN subframe. The additional control information may include a plurality of additional reference signals, a plurality of DL grants and DL data, a plurality of synchronization signals, or combinations thereof.

Figure 4A:
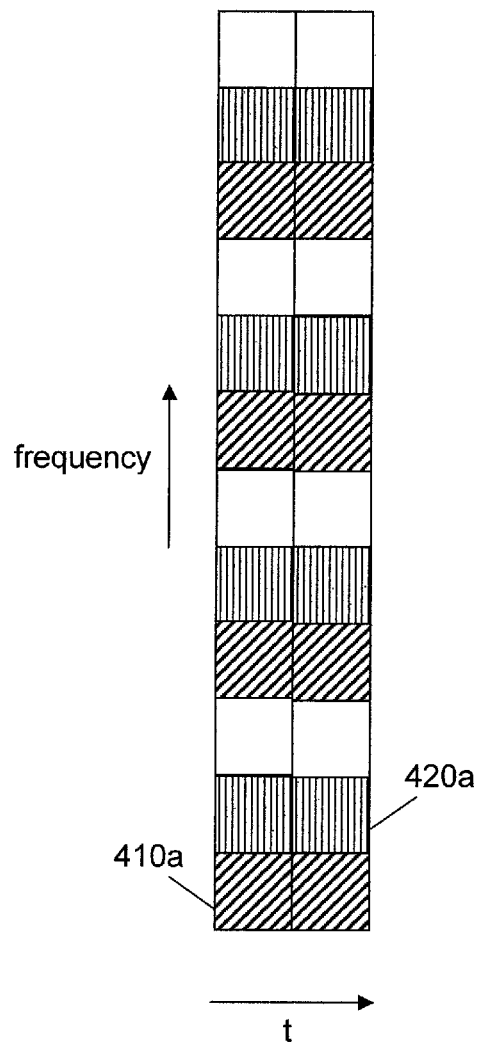
FIG. 4a is a diagram of a resource element configuration for a plurality of reference signals in a physical downlink control channel (PDCCH) according to an embodiment of the disclosure.

FIG. 4a illustrates a RE configuration 400a for a plurality of reference signals in the PDCCH of the control portion of the MBSFN subframe. The RE configuration 400a may comprise a plurality of first configured reference signals 410a and a plurality of second configured reference signals 420a, which may each be allocated to one RE. For instance, the first configured reference signals 410a may be used for the first two OFDM symbols in a subframe, which may be transmitted using four antennas. The first configured reference signals 410a may be a Rel 8 reference signal used to support Rel 8 UAs as well as Rel 10 UAs and may be allocated to a plurality of REs. The REs associated with the first configured reference signals 410a may be located at two contiguous time slots (for the two symbols) over a plurality of equally separated frequencies.

The second configured reference signals 420a may be allocated additional REs and may be added to improve the reliability/accuracy of channel estimation and mobility measurement. Further, the additional REs may be used to improve resource utilization. The second configured reference signals 410a may be used to support Rel 10 UAs without impacting Rel 8 UAs and may be allocated to a plurality of REs. For instance, the second configured reference signals 410a may be ignored by the Rel 8 UAs. Similar to the first configured reference signals 410a, the REs associated with the second configured reference signals 420a may be located at the two contiguous time slots (for the two symbols) over a plurality of equally separated frequencies. The two contiguous time slots of the second configured reference signals 420a may be aligned with the two contiguous time slots of the first configured reference signals 410a. However, the REs of the second configured reference signals 420a may be located at different frequencies than the first configured reference signals 410a. For instance, the REs of the second configured reference signals 420a may be located at adjacent frequencies with the first configured reference signals 410a.

Figure 4B:
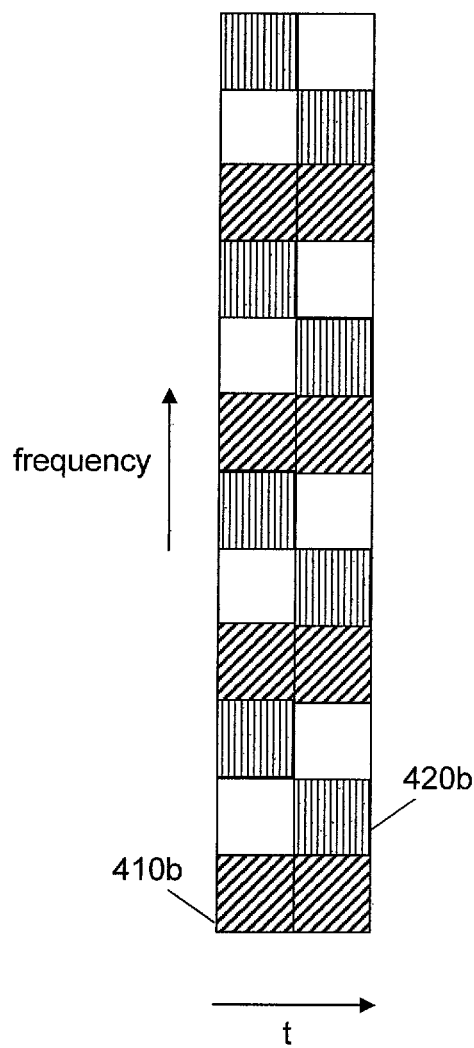
FIG. 4b is a diagram of another resource element configuration for a plurality of reference signals in a PDCCH according to an embodiment of the disclosure.

FIG. 4b illustrates another RE configuration 400b for the reference signals in the PDCCH of the control portion of the MBSFN subframe. The RE configuration 400b may comprise a plurality of first configured reference signals 410b, which may be similar to the first configured reference signals 410a, and a plurality of second configured reference signals 420b, which may use additional REs to improve resource utilization. Accordingly, the first configured reference signals 410b may support Rel 8 and Rel 10 UAs, while the second configured reference signals 420b may support Rel 10 UAs.

The REs associated with the second configured reference signals 420b may be located at two contiguous time slots (for the two symbols) over a plurality of equally separated frequencies. The two contiguous time slots of the second configured reference signals 420b may be aligned with the two contiguous time slots of the first configured reference signals 410b. However, the REs of the second configured reference signals 420a may be distributed over different frequencies and time combinations than the first configured reference signals 410a. Additionally, the REs corresponding to the first of the two contiguous time slots may be located over different frequencies than the REs corresponding to the second of the two time slots, which may further improve resource allocation and utilization, for example in comparison to the RE configuration 400a.

Figure 5:
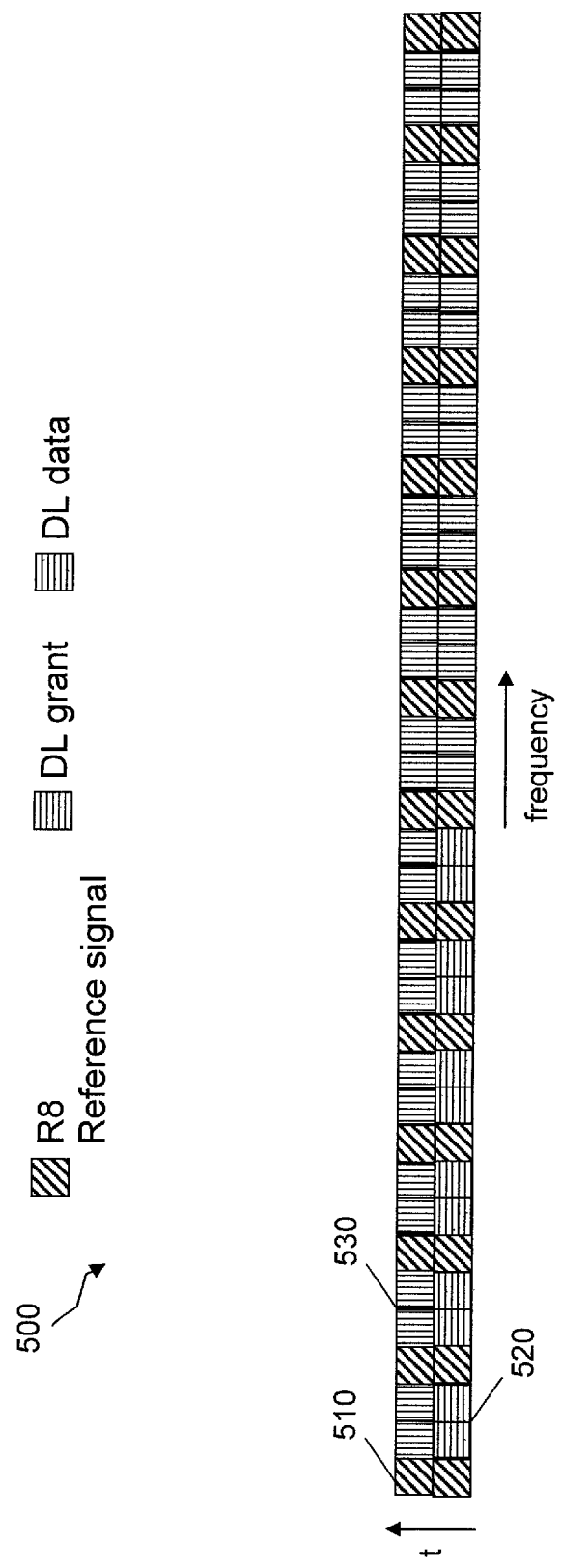
FIG. 5 is a diagram of a resource allocation for plurality of down link (DL) grants and data in a PDCCH according to an embodiment of the disclosure.

FIG. 5 illustrates a RE configuration 500 for a plurality of DL grants and data in the PDCCH of the control portion of the MBSFN subframe. The RE configuration 500 may comprise a plurality of configured reference signals 510, a plurality of configured DL grants, and a plurality of configured DL data blocks. Typically, the DL grants are used to indicate DL resources and the location of data in a PDSCH portion of the subframe. However, since the MBSFN subframe may not comprise a PDSCH, some data may be transported in the PDCCH using some of the REs that may otherwise be wasted. Hence, the configured DL grants 520 may indicate the DL resources in the PDCCH of the MBSFN subframe in addition to the location of the configured DL data blocks 530 in the PDCCH.

In the RE configuration 500, the configured reference signals 510 may be Rel 8 reference signals used to support Rel 8 UAs as well as Rel 10 UAs, and may be allocated a plurality of REs similar to the first configured reference signals 410a. The REs associated with the configured DL grants 520 may be located over a plurality of equally separated frequencies or continuous frequencies. The OFDM symbols of the configured DL grants 520 may be aligned with one of the two contiguous OFDM symbols of the configured reference signals 510. However, the REs of the configured DL grants 520 may be distributed over different frequencies than the configured reference signals 510. For instance, the configured DL grants 520 may use the REs at one OFDM symbol and at the frequencies between the REs of the configured reference signals 510. The REs associated with the configured DL data blocks 530 may be located at any available OFDM symbols aligned with one of the two contiguous OFDM symbols over a plurality of equally separated frequencies. For instance, the REs of some of the configured DL data blocks 530 may be located at one OFDM symbol contiguous to the OFDM symbol of the configured DL grants 520 at the same frequencies between the REs of the configured reference signals 510. Other configured DL data blocks 530 may use two contiguous OFDM symbols at the frequencies different from the configured DL grants 520 and between the configured reference signals 510.

In an embodiment, the configured DL grants 520 may be signaled in the PDCCH using a DCI format, such as one of the DCI formats described in the 3GPP TS 36.212. The location of the configured DL data blocks 530 and/or the amount of allocated resources may be specified in the configured DL grants 520 using a resource element group (REG) index, a control channel element (CCE) index, or an aggregated CCE index. Accordingly, the unit of resource allocation for the DL data blocks 530 may be a REG, a CCE, or an aggregated CCE. When the MBSFN subframe is received, the configured DL grants 520 may be detected and the corresponding REGs, CCEs, or aggregated CCEs may be decoded to obtain the configured DL data blocks 530.

In some embodiments, where the amount of resources in the PDCCH may be limited in comparison to the PDCCH, using the configured DL grants 520 and the configured DL data blocks 530 may be advantageous for semi-persistent scheduling (SPS) traffic, such as Voice over Internet Protocol (VoIP) traffic. Using SPS, the initial downlink and/or uplink transmissions may be configured with a resource on a semi-persistent basis without indicating the resource in the PDCCH every time before the resource is to be used. Accordingly, the configured DL grants 520 and the configured DL data blocks 530 may be transmitted in the PDCCH less frequently to configure the resource for the DL and/or UL, which may reduce the amount of resources required for the PDCCH. Similarly, other SPS control information, such as DL/UL SPS configuration and DL/UL SPS deactivation, may be transmitted less frequently in the PDCCH of the MBSFN subframe.

In addition to the reference signals and the DL grants/data, other control information may be transmitted in the PDCCH of the MBSFN subframe. For instance, a plurality of synchronization information may be transmitted in the control portion of the MBSFN subframe using any available REs to improve the synchronization process. Typically, the access node 106 may transmit a plurality of synchronization signals to the Rel 8 UAs for initial synchronization. The synchronization signals may comprise a primary synchronization channel and a secondary synchronization channel. The primary synchronization channel and the secondary synchronization channel may be transmitted periodically by the access node 106 and may then be detected by the UA 110, for instance to obtain a cell ID, such as an E-UTRAN cell ID, and timing information. Since the synchronization signals may be transmitted intermittently at separate time intervals, the UA 110 may establish synchronization after some time delay.

In an embodiment, to reduce the synchronization time for the Rel 10 UAs, additional primary and secondary synchronization signals may be transmitted by the relay node 102 in the PDCCH of the MSBFN subframe. The additional primary and secondary synchronization signals may be transmitted using any available REs, e.g., any REs that are not used for the reference signals and/or DL grants/data. Specifically, the access node 106 may initially broadcast the MBSFN subframe configuration for any relay node in the system, which may be the same or different information for each relay node. Alternatively, the access node 106 may signal the MBSFN subframe configuration for the relay node 102, for instance using the RRC protocol. The UA 110 may receive the MBSFN subframe configuration for the relay node 102 and use the MBSFN configuration to obtain the transmission pattern, e.g. timing and resources, of the additional primary and secondary synchronization signals in the PDCCH of the MBSFN subframe. The UA 110 may then use the additional primary and secondary synchronization signals, in addition to the primary and secondary synchronization signals from the relay node 102, to establish faster synchronization, e.g. to obtain the cell ID with less time delay.

Figure 6:
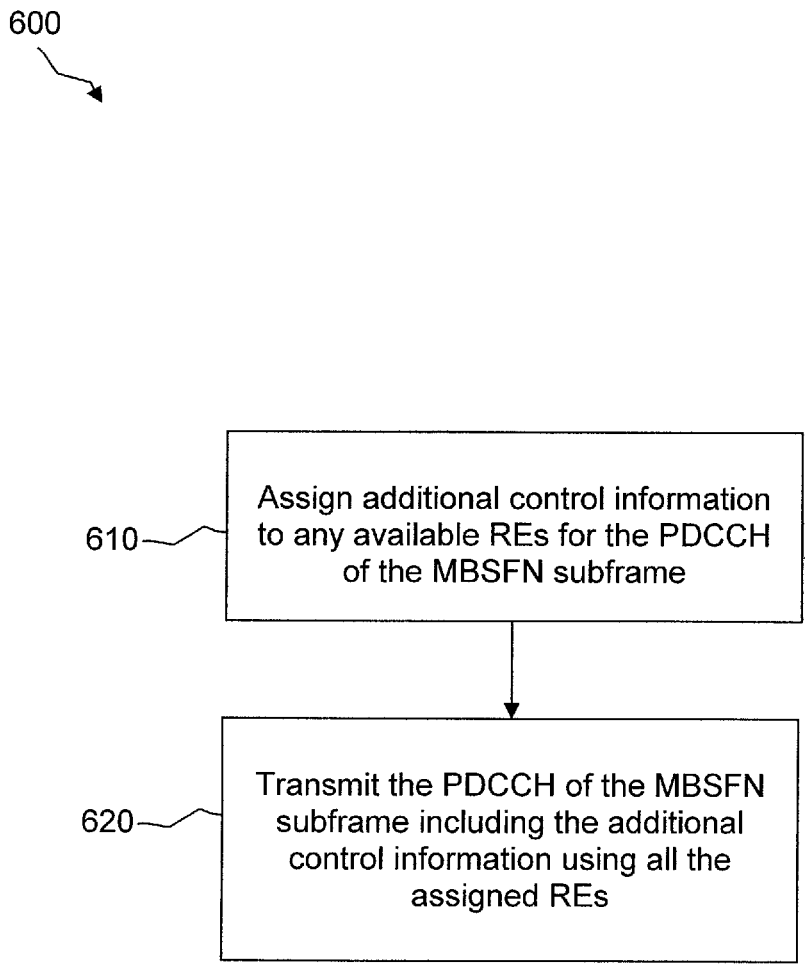
FIG. 6 is a flowchart of a method for transmitting control information in a PDCCH of a MBSFN subframe according to an embodiment of the disclosure.

FIG. 6 illustrates an embodiment of a method 600 for transmitting control information in a PDCCH of a MBSFN subframe according to an embodiment of the disclosure. In block 610, the relay node 102 may assign additional information to any available REs for the PDCCH of the MBSFN subframe. The additional information may comprise additional reference signals, which maybe different than Rel 8 reference signals and may be used for Rel 10 UAs. Additionally or alternatively, the additional information may comprise a plurality of DL grants and a plurality of DL data blocks. Additionally or alternatively, the additional information may comprise additional primary and secondary synchronization signals. In block 620, the relay node 102 may use all the assigned REs to transmit the PDCCH of the MBSFN subframe including the additional information. The UA 110 may receive the MBSFN subframe and detect the control information in the PDCCH and the additional information using the assigned REs.

Figure 7:
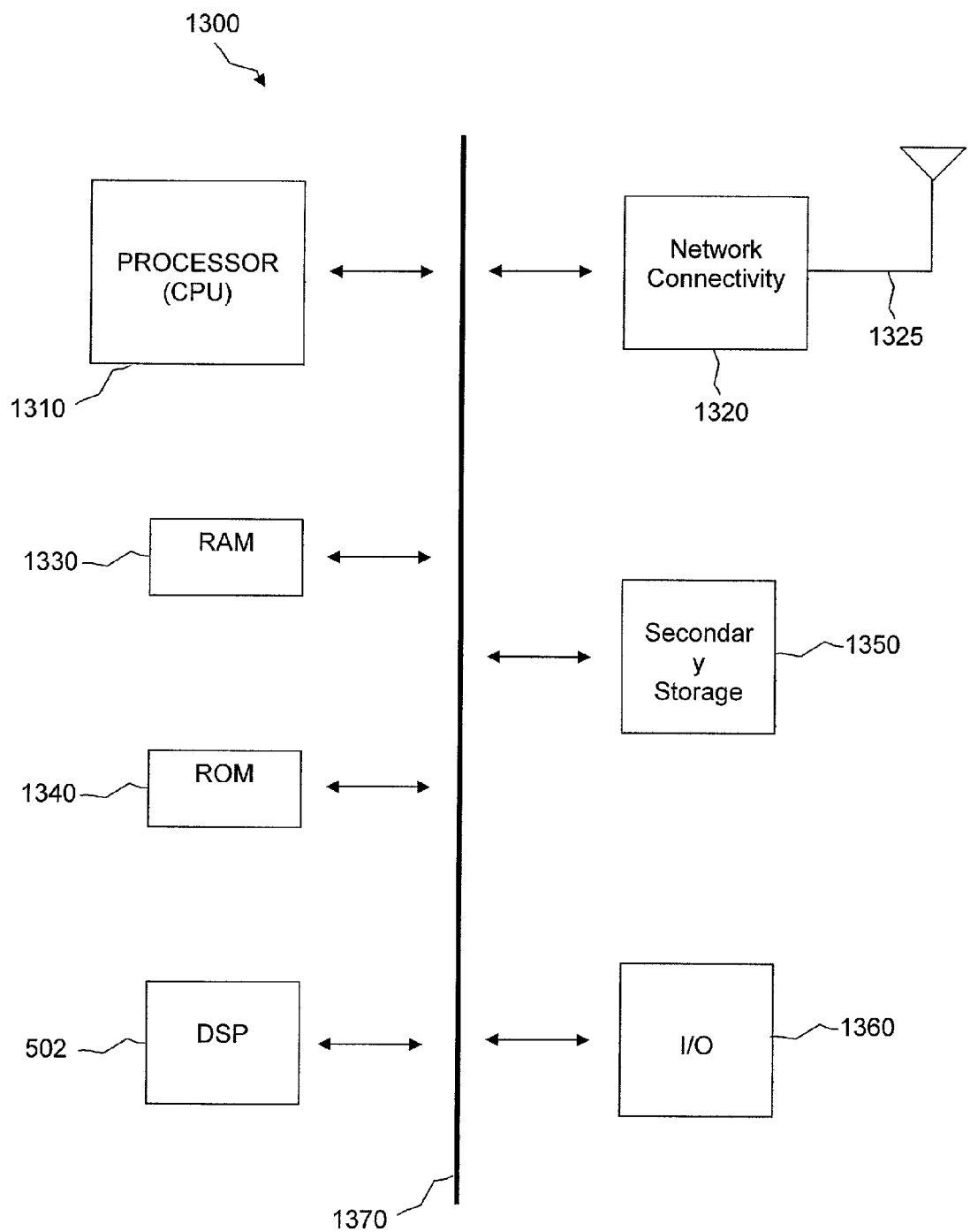
FIG. 7 illustrates a processor and related components suitable for implementing the several embodiments of the present disclosure.

The UA 110 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 502. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 36.813 and 3GPP TS 36.814.

In an embodiment, a relay node is provided. The relay node comprises a processor configured such that the relay node transmits a MBSFN subframe including a control portion without a data portion, wherein the control portion comprises additional information assigned to unused REs. In an embodiment, the additional information of the relay node is transmitted in a physical downlink control channel (PDCCH) of the MBSFN subframe. In an embodiment, the unused REs of the relay node are unused for receiving Rel 8 control information.

In another embodiment, a UA is provided. The UA comprises a processor configured such that the UA receives a MBSFN subframe including a control portion without a data portion, wherein the control portion comprises additional information assigned to unused REs.

In another embodiment, a method is provided comprising transmitting a MBSFN subframe including a control portion without a data portion, wherein the control portion comprises additional information assigned to unused REs.

In another embodiment, a method is provided comprising receiving a MBSFN subframe including a control portion without a data portion, wherein the control portion comprises additional information assigned to unused REs.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A relay node, comprising:
    a processor configured such that the relay node transmits a multicast/broadcast single frequency network (MBSFN) subframe including a control portion without a data portion,
        wherein the control portion comprises information required to support user agents (UAs) and additional information that is assigned to unused resource elements (REs), and
        the additional information comprises a plurality of downlink (DL) grants, a plurality of associated DL data blocks to enhance DL throughput, and a plurality of primary and secondary synchronization signals.

2. The relay node of claim 1, wherein the relay node uses the unused REs for transmitting control information and the plurality of associated DL data blocks in the control portion, wherein the plurality of associated DL blocks would otherwise be transmitted in the data portion.

3. The relay node of claim 1, wherein the plurality of DL grants and the plurality of associated DL data blocks are received in a physical downlink control channel (PDCCH) of the MBSFN subframe, and wherein the plurality of DL grants indicate resources and/or location information for obtaining the plurality of associated DL data blocks from the PDCCH.

4. The relay node of claim 1, wherein the control portion comprises a physical downlink control channel (PDCCH) that uses a substantial quantity of the unused REs to transmit data that would otherwise be transmitted in a physical downlink shared channel (PDSCH).

5. The relay node of claim 1, wherein the information required to support UAs comprises a first plurality of reference signals configured for Release 8 UAs, and wherein the additional information comprises a second plurality of reference signals configured for Release 10 UAs.

6. The relay node of claim 1, wherein the additional information is used to support a Release 10 (Rel 10) user agent (UA), and wherein the information required to support UAs is used to support a Rel 8 UA.

7. A user agent (UA), comprising:
    a processor configured such that the UA receives a multicast/broadcast single frequency network (MBSFN) subframe including a control portion without a data portion,
        wherein the control portion comprises information required to support UAs and additional information that is assigned to unused resource elements (REs), and
        the additional information comprises a plurality of downlink (DL) grants, a plurality of associated DL data blocks to enhance DL throughput, and a plurality of primary and secondary synchronization signals.

8. The UA of claim 7, wherein the unused REs are used for receiving control information and the plurality of associated DL data blocks in the control portion of the MBSFN.

9. The UA of claim 7, wherein the additional information further comprises a plurality of reference signals received in a physical downlink control channel (PDCCH) of the MBSFN subframe, wherein the plurality of reference signals are configured to support a Release 10 (Rel 10) user agent (UA).

10. The UA of claim 7, wherein the plurality of DL grants and the plurality of associated DL data blocks are received in a physical downlink control channel (PDCCH).

11. The UA of claim 10, wherein the plurality of DL grants are obtained by detecting a downlink control information (DCI) format in the PDCCH of the MBSFN subframe, and wherein the UA is configured to use the plurality of DL grants to obtain the plurality of associated DL data blocks from the PDCCH rather than a physical downlink shared channel (PDSCH).

12. A method of wireless communication, comprising:
    transmitting a multicast/broadcast single frequency network (MBSFN) subframe including a control portion without a data portion,
        wherein the control portion comprises information required to support user agents (UAs) and additional information that is assigned to unused resource elements (REs), and
        the additional information comprises a plurality of downlink (DL) grants, a plurality of associated DL data blocks to enhance DL throughput, and a plurality of primary and secondary synchronization signals.

13. The method of claim 12, wherein the additional information comprises a first plurality of reference signals, and wherein the first plurality of reference signals are transmitted with a second plurality of reference signals in a physical downlink control channel (PDCCH) of the MBSFN subframe at about the same time, wherein the first plurality of reference signals are configured to support long-term evolution advanced (LTE-A) UAs, and the second plurality of reference signals are configured to support LTE UAs.

14. The method of claim 12, wherein the additional information comprises a first plurality of reference signals, and wherein the first plurality of reference signals are transmitted with a second plurality of reference signals in a physical downlink control channel (PDCCH) of the MBSFN subframe.

15. The method of claim 14, wherein the first plurality of reference signals comprise different reference signals than the second plurality of reference signals, and wherein the first and second plurality of reference signals are transmitted in the PDCCH at different times and frequencies.

16. The method of claim 12, wherein the primary and secondary synchronization signals are used to obtain a cell ID with other synchronization signals initially broadcasted by an access node.

17. The method of claim 12, wherein the primary and secondary synchronization signals are used to obtain a cell ID with other synchronization signals initially signaled by an access node.

18. The relay node of claim 1, wherein the primary and secondary synchronization signals are transmitted in a physical downlink control channel (PDCCH) of the MBSFN subframe.

* * * * *